United States Patent [19]

LaBarge et al.

[11] 4,228,851
[45] Oct. 21, 1980

[54] SOLAR HEATING PANEL

[75] Inventors: Robert L. LaBarge, Ben Avon; Marvin H. Williams, New Kensington, both of Pa.

[73] Assignee: Aluminum Company of America, Pittsburgh, Pa.

[21] Appl. No.: 823,926

[22] Filed: Aug. 12, 1977

[51] Int. Cl.³ .................................................. F28F 3/12
[52] U.S. Cl. ...................................... 165/170; 126/444; 126/448; 428/184
[58] Field of Search .................. 165/170, 171, 166; 126/271, 444, 445, 448; 428/178, 184, 188, 166, 167; 29/157.3 D; 113/118 D, 118 V

[56] References Cited
U.S. PATENT DOCUMENTS

| 2,059,114 | 10/1936 | Karmazin | 165/166 |
| 2,143,171 | 1/1939 | Anderson | 165/170 |
| 2,782,009 | 2/1957 | Rippingille | 165/166 |
| 3,086,899 | 4/1963 | Smith et al. | 428/167 |
| 3,219,514 | 11/1965 | Roysancour | 428/178 |
| 3,239,000 | 3/1966 | Meagher | 126/271 |
| 3,265,121 | 8/1966 | Hickman | 165/170 |
| 3,940,529 | 2/1976 | Hepford et al. | 428/178 |
| 3,951,128 | 4/1976 | Schoenfelder | 126/271 |
| 4,060,070 | 11/1977 | Harter | 165/171 |
| 4,077,393 | 3/1978 | Mattson | 126/271 |
| 4,114,597 | 9/1978 | Erb | 165/170 |

FOREIGN PATENT DOCUMENTS

| 557550 | 5/1958 | Canada | 165/166 |
| 153582 | 3/1932 | Switzerland | 165/170 |
| 216359 | 11/1941 | Switzerland | 165/170 |

Primary Examiner—Sheldon Jay Richter
Attorney, Agent, or Firm—David J. Hill; David W. Brownlee

[57] ABSTRACT

A solar heating panel is disclosed which is formed from two corrugated plastic sheets joined face-to-face to form multiple passageways therethrough for flow of a fluid medium. Each of the components is generally rectangular with the corrugations having diverging sidewall portions spaced by transverse wall portions and with the sidewall portions of opposing components in parallel overlapping and contacting relation and the transverse wall portions spaced apart and forming passageways therebetween.

2 Claims, 2 Drawing Figures

SOLAR HEATING PANEL

BACKGROUND OF THE INVENTION

1. Field of Art

This invention relates to heat exchangers and in particular to solar panels formed by two corrugated plastic sheets joined face-to-face.

2. Brief Description of the Prior Art

It is well-known to form heat exchangers from corrugated sheets joined together as disclosed in U.S. Pat. Nos. 2,782,009; 2,812,165; 3,145,707 and 3,360,038, among others. The corrugations in the sheets form passageways through the heat exchanger for flow of liquid or gaseous medium. U.S. Pat. No. 3,868,945 is also of interest for the disclosure of flat plastic sheets sealed together to form a continuous sinuous flow path in a heat exchanger. In heat exchangers of this type, the internal pressure of the medium flowing therethrough can cause the sheets to be separated resulting in leakage between the passageways or from the exchangers. This is particularly a problem in heat exchangers made of plastic components which are adhesively joined. A pressure of 60 to 100 psi or more can break the adhesive bond between the sheet components in such a heat exchanger. U.S. Pat. No. 2,059,114 discloses a combined condenser and receiver comprising a plurality of sheet metal members stacked and bonded together to provide a receiving chamber and conduit.

An improved heat exchanger is desired which can be made from corrugated plastic components adhesively joined together with a strong enough bond to avoid separation by internal pressure in the heat exchanger.

SUMMARY OF THE INVENTION

This invention provides a heat exchanger formed by two corrugated sheet components in which the corrugations have diverging sidewall portions spaced by transverse wall portions with the sidewall portions of opposing panels adhesively bonded in parallel overlapping and contacting relationship and the transverse walls of opposing panels spaced apart to form passageways for the flow of fluid medium therethrough. The panel has hollow headers on both ends of the passageways and communicating therewith for flow of the fluid medium into and out of the passageways from associated equipment.

An object of this invention is to provide an improved heat exchanger construction which may be made of plastic components adhesively bonded together. The above objects and advantages of this invention will be more fully appreciated and understood with reference to the following description and the drawings attached hereto.

DESCRIPTION OF A PREFERRED EMBODIMENT

In accordance with this invention a heat exchanger is disclosed for uses such as a solar collector in a solar heating or cooling system in which the heat exchanger is made of plastic components which are joined together in face-to-face relation with a plurality of passageways therethrough for a medium such as water or a refrigerant to pass therethrough. The plastic components are adhesively bonded at their interface to prevent separation of the components under internal pressure. The adhesive bond between the components is provided at an interface disposed at a relatively sharp angle to the direction of force resulting from internal pressure so the bond is stressed under shear rather than tension. The adhesive bond can withstand a much higher shear stress than tensional stress so the heat exchanger can withstand a much higher internal pressure than is otherwise possible without sacrifice of considerable material for forming the bond. The bond in this invention is provided between a minor portion of the interface of the plastic components and still will hold relatively high pressures without separation. This small area of bonded interface allows approximately 80–90% of the surface area of the panel that is incident to a heat source such as the sun to be cooled by the medium flowing through the panel.

Figure 1:
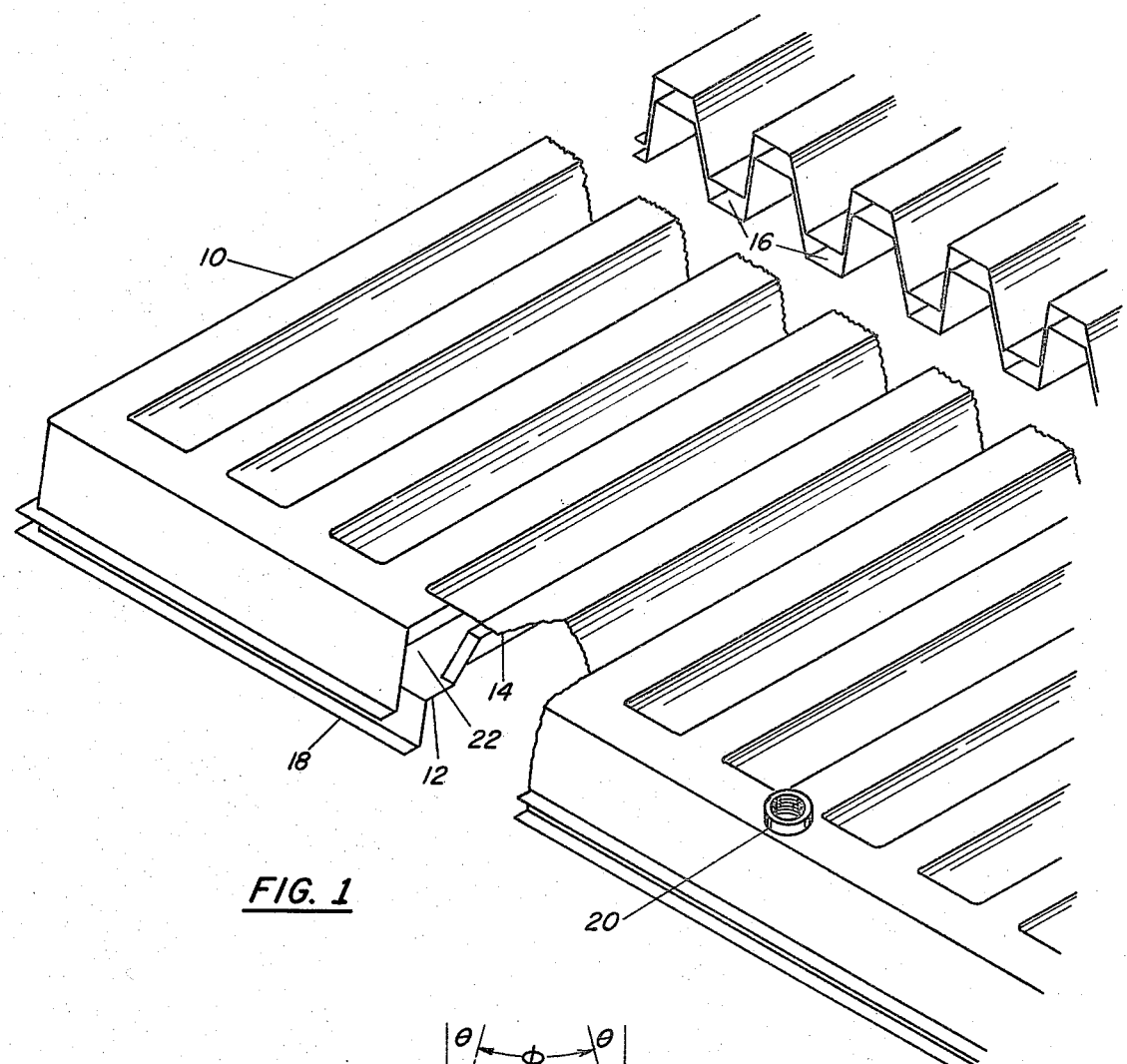
FIG. 1 is a perspective view of a heat exchanger of this invention partially cut away to show the construction of the components forming the heat exchanger.

FIG. 1 illustrates an exemplary heat exchanger of this invention formed by two corrugated sheet members 12 and 14 joined together to provide a plurality of passageways 16 through the heat exchanger for flow of a medium such as liquid or gas therethrough. The components 12 and 14 are preferably formed from plastic material such as ABS and may have a protective coating on the exterior surface thereof to protect the ABS from the ultraviolet rays contained in sunlight. An exemplary coating is an acrylic plactic film such as that sold by Korad, Inc. under the trademark "Korad". It will be apparent to those skilled in the art that the components may be formed of any number of materials, both plastic and metal, and the choice of such material depends on its cost and weatherability, among other factors. If the components are made of plastic, they can be vacuum formed by processes well-known in the art. In a solar heating panel the sheets are preferably a flat black color to absorb a maximum of heat energy from the sun.

The heat exchanger 10 has integral headers 18 on each end for receiving and distributing the cooling medium through the passageways in the heat exchanger. The headers 18 each have a tapped nipple 20 joined thereto by an adhesive or otherwise, for connection to the header pipes, not shown, for flow of the coolant into the headers. To provide for maximum fluid flow, the cross-sectional area of the passageway 22 in the header at the location of nipple 20 is preferably approximately equal to the total cross-sectional area of all the passageways 16 through the panel 10. In the embodiment selected for illustration, the passageway 22 in the header 18 is of uniform cross-sectional area along the length of the header. However, it will be apparent to those skilled in the art that the passage 22 in the header 18 may be of reduced area toward opposite ends of the header to provide a uniform velocity of flow of coolant through the passageways in the panel.

Figure 2:
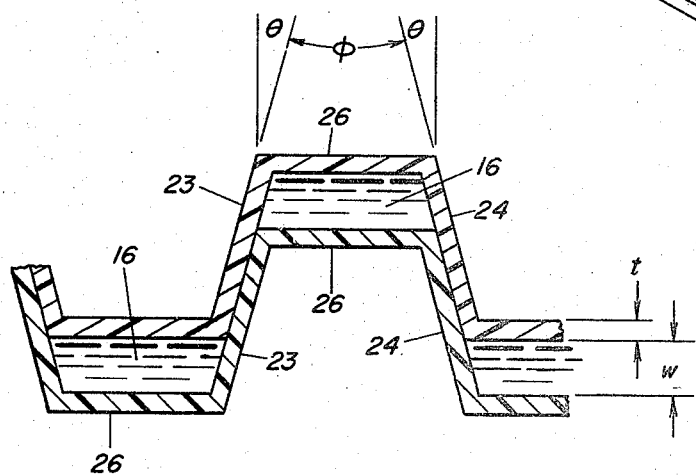
FIG. 2 is an enlarged cross-sectional view through a portion of the heat exchanger illustrated in FIG. 1.

FIG. 2 is an enlarged cross-sectional view through a panel showing the configuration of the corrugations in the panel and the adhesively bonded area between components. Each component has corrugations formed therein by divergent sidewall portions 23 and 24 spaced by transverse wall portions 26. The sidewall portions 23 and 24 in the opposing components are in parallel overlapping relation, and the transverse walls 26 of the opposing panels are spaced apart to form passageways therebetween. In a preferred embodiment of the invention, as shown in FIG. 2, the sidewall portions all have the same angle theta ($\theta$) with respect to lines perpendicular to the general plane of the panel. It will be appreciated, however, that the sidewalls 23 and 24 may have different angles with respect to the perpendicular.

Also shown in FIG. 2 is included angle phi ($\phi$), the angle between the sidewall portions. When the sidewall portions have the same angle theta with respect to lines perpendicular to the general plane of the panel (as shown in FIG. 2), the measure of the included angle phi equals twice the measure of the angle theta, according to well-known geometrical principles.

When the components are adhesively joined at the overlap of the sidewalls 23 and 24, internal pressure in the passageway 16 tends to force the components apart in directions normal to the general plane of the panel. With a relatively small angle theta, such force tending to separate the panels places the adhesive bond more in shear than in tension. If the angle theta were relatively large, most of the stress on the adhesive bond would be in tension. It is well-known that an adhesive bond can withstand substantially greater shear stresses than tensional stresses. Accordingly, the construction of a panel of this invention provides the strong adhesive bond between the components 12 and 14 with a minimum of area required for such adhesive bond. As seen in FIG. 2, only approximately 20% of the area of the components is adhesively bonded together. By minimizing the area of bonding, it is possible to maximize the area employed for heat transfer to the coolant flowing through the passageway 16.

The preferred angle theta can vary substantially, depending upon design and manufacturing constraints. However, as has been pointed out, it is desirable that theta be small in order to reduce tension on the adhesive bond. In addition, a value of theta may be selected that will provide the desired passageway cross section for a given component wall thickness, and that will allow the components to have substantially identical cross-sectional profiles. This value of the angle theta may be determined from the relation $$\theta = \arcsin [t/(w+t)],$$

where
t = component wall thickness, and
w = width of passageway (see FIG. 2).

When theta has such a value, and when the sidewall portions have the same angle theta with respect to lines perpendicular to the general plane of the panel, the value of the included angle phi equals twice the value of the angle theta, or $$\phi = 2 \arcsin [t/(w+t)] \text{ radians.}$$

In the embodiment selected for illustration, the transverse walls 26 are substantially planar. It will be appreciated, however, that such transverse walls may also have other configurations such as arcuate. However, the planar configuration of such transverse walls provides a maximum cross-sectional area in the passageway 16 with a minimum of material.

Another advantage of the panel construction of this invention is the structural strength provided by the corrugations in the components 12 and 14. When the panel 10 is used for solar heating purposes, the panel is exposed to the elements which sometimes includes relatively high winds. With the present invention, it is possible to secure the panel on a roof or wall with clips around the periphery of the panel and still be able to withstand wind speeds of up to 100 or more miles per hour.

In a typical construction of this invention, the panels may be approximately 4 feet by 4 feet square and weigh approximately 11 pounds dry weight. The ABS used in such panels may be approximately 0.060 inch thick, with the sidewalls and transverse walls being approximately 0.688 inches long. In such a construction the overlap area between sidewalls may be approximately 0.268 inches long and the angle of inclination with respect to normal may be approximately 14°. It is common practice for 20 or more panels to be interconnected in a solar heating system for heating the water in swimming pool or the like. The panels may be connected into the existing water circulation system for filtering the water in the swimming pool. Such connection requires little additional hardware except for the panels and connecting pipes.

It is seen that this invention provides an improved heat exchanger adapted to be made of plastic material which will withstand internal pressures in the exchanger with a minimum of bonded area and maximum area for heat transfer. While the invention has been described in terms of a single preferred embodiment, the claims appended hereto are intended to encompass all embodiments which fall within the spirit of the invention.

Having thus described our invention and certain embodiments thereof, we claim:

1. A heat exchanger comprising two corrugated sheet components joined together face-to-face to form a panel having multiple passageways therein between the components for flow of a fluid medium therethrough, each of said components being generally rectangular with parallel corrugations therein formed by diverging sidewall portions spaced by transverse wall portions between each sidewall portion, and with the sidewall portions of the opposing components joined together in with adhesive bonding parallel overlapping and contacting relation and the transverse walls of opposing panels spaced apart and forming passageways therebetween.

2. A solar heat absorbing panel having parallel passageways therethrough and hollow headers on opposite ends of the passageways and communicating therewith, said panel comprising two corrugated sheet components of plastic material joined together face-to-face, with each component being generally rectangular with parallel corrugations therein formed by planar diverging sidewall portions with an included angle in a range of 20 to 30 degrees and spaced by transverse wall portions, said sidewall portions of the opposing components being adhesively bonded in overlapping and contacting relation and said transverse walls of the opposing panels spaced apart and forming said passageways therebetween.

* * * * *